United States Patent
Chin et al.

(10) Patent No.: US 11,317,461 B2
(45) Date of Patent: Apr. 26, 2022

(54) METHOD AND APPARATUS FOR GENERATING MAC PDU

(71) Applicant: FG Innovation Company Limited, Tuen Mun (HK)

(72) Inventors: Heng-Li Chin, Taipei (TW); Chie-Ming Chou, Hsinchu (TW); Hung-Chen Chen, Hsinchu (TW); Chia-Hung Wei, Hsinchu (TW); Wan-Chen Lin, Hualien (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/535,479

(22) Filed: Aug. 8, 2019

(65) Prior Publication Data

US 2020/0053820 A1 Feb. 13, 2020

Related U.S. Application Data (60) Provisional application No. 62/716,092, filed on Aug. 8, 2018.

(51) Int. Cl.
*H04W 76/27* (2018.01)
*H04W 72/10* (2009.01)
*H04W 28/06* (2009.01)

(52) U.S. Cl.
CPC ......... *H04W 76/27* (2018.02); *H04W 28/065* (2013.01); *H04W 72/10* (2013.01)

(58) Field of Classification Search
None
See application file for complete search history.

(56) References Cited

U.S. PATENT DOCUMENTS

| 2011/0170495 A1* | 7/2011 | Earnshaw | H04L 5/0091 370/329 |
| 2018/0310308 A1* | 10/2018 | Loehr | H04W 72/1289 |

(Continued)

FOREIGN PATENT DOCUMENTS

| CN | 104349385 A | 2/2015 |
| CN | 106063326 A | 10/2016 |

(Continued)

OTHER PUBLICATIONS

3rd Generation Partnership Project; Technical Specification Group Radio Access Network; Evolved Universal Terrestrial Radio Access (E-UTRA); Medium Access Control (MAC) protocol specification (Release 14) 3GPP TS 36.321 V14.4.0 Sep. 30, 2017 (Sep. 30, 2017) the whole document.

*Primary Examiner* — Rebecca E Song
(74) *Attorney, Agent, or Firm* — ScienBiziP, P.C.

(57) ABSTRACT

A User Equipment (UE) includes one or more non-transitory computer-readable media having computer-executable instructions embodied thereon and at least one processor coupled to the one or more non-transitory computer-readable media. The at least one processor is configured to execute the computer-executable instructions to: receive, from a base station, a Radio Resource Control (RRC) message to configure one or more logical channels; receive, from the base station, an allocation of a first radio resource for uplink transmission; receive, from the base station, a priority indicator to determine whether a first priority order or a second priority order is used in a first logical channel prioritization (LCP) procedure; and apply the first LCP procedure on the one or more logical channels to generate a first Medium Access Control (MAC) Protocol Data Unit (PDU) to be transmitted on the first radio resource.

12 Claims, 4 Drawing Sheets

(56) References Cited

U.S. PATENT DOCUMENTS

| | | | |
|---|---|---|---|
| 2019/0239242 A1* | 8/2019 | Yi | H04W 72/1242 |
| 2019/0342941 A1* | 11/2019 | Tang | H04W 76/11 |
| 2019/0394785 A1* | 12/2019 | He | H04L 1/0002 |
| 2020/0037151 A1* | 1/2020 | Du | H04L 1/22 |
| 2020/0037345 A1* | 1/2020 | Ryoo | H04W 76/27 |
| 2020/0177497 A1* | 6/2020 | Xiao | H04L 1/08 |
| 2020/0245188 A1* | 7/2020 | Zhang | H04W 28/065 |
| 2020/0267753 A1* | 8/2020 | Adjakple | H04W 72/14 |

FOREIGN PATENT DOCUMENTS

| | | |
|---|---|---|
| CN | 107439049 A | 12/2017 |
| CN | 107580763 A | 1/2018 |
| EP | 2244514 A1 | 10/2010 |

* cited by examiner

METHOD AND APPARATUS FOR GENERATING MAC PDU

CROSS-REFERENCE TO RELATED APPLICATION(S)

The present application claims the benefit of and priority to a provisional U.S. Patent Application Ser. No. 62/716,092, filed on Aug. 8, 2018, entitled "Traffic Prioritization and Differentiation Based on Different UL Grant Types," (hereinafter referred to as "US74693 application"). The disclosure of the US74693 application is hereby incorporated fully by reference into the present application.

FIELD

The present disclosure generally relates to wireless communication, and more particularly, to generation of a Medium Access Control (MAC) Protocol Data Unit (PDU) for the next generation wireless communication networks.

BACKGROUND

Various efforts have been made to improve different aspects of wireless communications, such as data rate, latency, reliability and mobility, for the next generation (e.g., 5G New Radio (NR)) wireless communication systems. To support diverse use cases such as enhanced Mobile Broadband (eMBB), Ultra-reliable and Low Latency Communications (URLLC) and massive Machine Type Communication (mMTC), the radio frame structure and most of the Medium Access Control (MAC) layer procedures in NR are designed to have high flexibility. In addition, NR also may implement a more robust radio resource, for example, having a low Block Error Rate (BLER). The new type of radio resource may aim to achieve a target BLER of $10^{-5}$ or less. A base station may indicate the allocation of radio resources via a Downlink Control Information (DCI) message to one or more UEs. The DCI message may be associated with either a new Modulation and Coding Scheme (MCS) table or an old MCS table. For example, the new MCS table may aim to achieve a target BLER of $10^{-5}$ or less, and the old MCS table may aim to achieve a target BLER of $10^{-1}$.

One function of the MAC layer of a User Equipment (UE) is Logic Channel Prioritization (LCP), which may be applied when a new transmission is performed. When a base station (e.g., an eNB, ng-eNB, or gNB) assigns uplink resources for the UE to transmit uplink data, the UE may perform the LCP procedure to allocate the uplink resources to appropriate logical channels. The LCP procedure may create a MAC protocol data unit (PDU). In NR wireless communication systems, there is a need for providing a method for generating the MAC PDU to properly differentiate the radio resources associated with different MCS tables.

SUMMARY

The present disclosure is directed to generation of a MAC PDU for the next generation wireless communication networks.

According to an aspect of the present disclosure, a UE is provided. The UE includes one or more non-transitory computer-readable media having computer-executable instructions embodied thereon and at least one processor coupled to the one or more non-transitory computer-readable media. The at least one processor is configured to execute the computer-executable instructions to: receive, from a base station, a Radio Resource Control (RRC) message to configure one or more logical channels; receive, from the base station, an allocation of a first radio resource for uplink transmission; receive, from the base station, a priority indicator to determine whether a first priority order or a second priority order is used in a first LCP procedure; and apply the first LCP procedure on the one or more logical channels to generate a first MAC PDU to be transmitted on the first radio resource.

According to another aspect of the present disclosure, a method for generating a MAC PDU performed by a UE is provided. The method includes: receiving, from a base station, an RRC message to configure one or more logical channels; receiving, from the base station, an allocation of a first radio resource for uplink transmission; receiving, from the base station, a priority indicator to determine whether a first priority order or a second priority order is used in a first LCP procedure; and applying the first LCP procedure on the one or more logical channels to generate a first MAC PDU to be transmitted on the first radio resource.

BRIEF DESCRIPTION OF THE DRAWINGS

Aspects of the example disclosure are best understood from the following detailed description when read with the accompanying figures. Various features are not drawn to scale, dimensions of various features may be arbitrarily increased or reduced for clarity of discussion.

DETAILED DESCRIPTION

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GERAN, a ng-eNB as in an E-UTRA base station in connection with the 5GC, a next generation Node B (gNB) as in the 5G-RAN, and any other apparatus capable of controlling radio communication and managing radio resources within a cell. The base station may serve one or more UEs through a radio interface.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting Proximity Service (ProSe) or Vehicle to Everything (V2X) service. Each cell may have overlapped coverage areas with other cells.

As discussed above, the frame structure for NR is to support flexible configurations for accommodating various next generation (e.g., 5G NR) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

In NR, a new MCS table which has a more robust characteristic is introduced. A UL grant or a Physical Uplink Shared Channel (PUSCH) resource associated with the new MCS table that achieves a BLER of $10^{-5}$ (or less) implies the introduction of a "reliability" consideration in additional to the "latency" consideration. In one implementation, traffic types in NR may be categorized as:

Type A: no reliability requirement & no latency requirement;
Type B: no reliability requirement & strict latency requirement;
Type C: high reliability requirement & no latency requirement;
Type D: high reliability requirement & strict latency requirement (e.g., URLLC).

Among these four categories, the existing system may need to be modified to ensure that the service requirements of the types B, C, and D traffic can be met. Modifications may be done by jointly considering the LCP procedure and procedures related to the UL grant reception.

Figure 1:
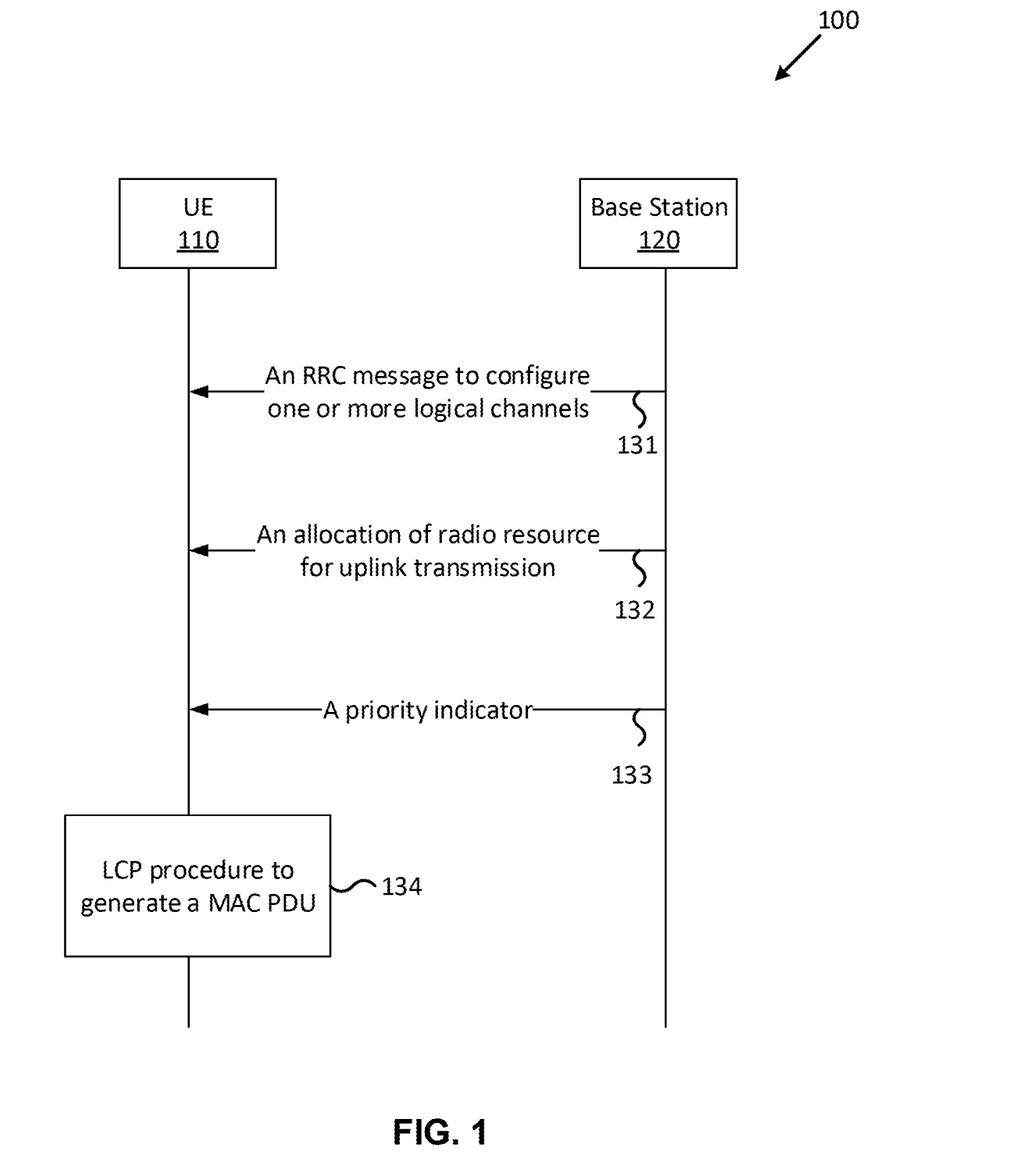
FIG. 1 is a diagram illustrating a process of a UE generating a MAC PDU, according to an example implementation of the present application.

FIG. 1 is a diagram 100 illustrating a process of a UE generating a MAC PDU, according to an example implementation of the present application. In action 131, a UE 110 may receive, from a base station 120 (e.g., a gNB, an eNB, or another type of base station), an RRC message to configure one or more logical channels. In one implementation, the RRC message may include an information element (IE) LogicalChannelConfig. In one implementation, the IE LogicalChannelConfig may configure each logical channel with several parameters that may be used in an LCP procedure, such as Priority (an increasing priority value may indicate a lower priority level), Prioritized Bit Rate (PBR), and Bucket Size Duration (BSD). These parameters for uplink data scheduling may be used in an LCP procedure that adopts a token bucket model.

In action 132, the UE 110 may receive, from the base station 120, an allocation of a first radio resource for an uplink transmission, such as the allocation of a PUSCH. In one implementation, the uplink transmission may be based on a configured grant Type 1, and the allocation of the first radio resource may be carried in an RRC message (which may be the same as or different from the RRC message in action 131). In one implementation, the uplink transmission may be based on a configured grant Type 2 or a dynamic grant, and the allocation of the first radio resource may be carried in a DCI message.

In action 133, the UE 110 may receive, from the base station 120, a priority indicator to determine whether a first priority order or a second priority order is used in a first LCP procedure. In one implementation, the priority indicator may be a one-bit flag. For example, the first priority order may be used in the first LCP procedure when the flag is '0', and the second priority order may be used in the first LCP procedure when the flag is '1'. In one implementation, the priority indicator may include multiple bits. For example, the first priority order may be used in the first LCP procedure when all bits in the priority indicator are '0', and the second priority order may be used in the first LCP procedure when at least one bit in the priority indicator is '1'.

The first priority order may be different from the second priority order. In one implementation, the first priority order may also be referred to as a normal LCP order, whereas the second priority order may also be referred to as a modified LCP order. In one implementation, the normal LCP order may be referred to an LCP order specified in the standard specification 3GPP TS 38.321. In one implementation, when the first priority order (e.g., the normal LCP order) is adopted, logical channels may be prioritized in accordance with the following order (from highest priority to lowest priority):

Cell-Radio Network Temporary Identifier (C-RNTI) MAC Control Element (CE) or data from UL-Common Control Channel (UL-CCCH);
Configured Grant Confirmation MAC CE;
MAC CE for Buffer Status Report (BSR), with exception of BSR included for padding;
Single Entry Power Headroom Report (PHR) MAC CE or Multiple Entry PHR MAC CE;
Data from any Logical Channel, except data from UL-CCCH;
MAC CE for Recommended bit rate query;
MAC CE for BSR included for padding.

In action 134, the UE 110 may apply the first LCP procedure on the one or more logical channels to generate a first MAC PDU to be transmitted on the first radio resource. The first LCP procedure may adopt a specific priority order based on the priority indicator received in action 133. In one implementation, after generating the first MAC PDU, the UE 110 may send the first MAC PDU to the base station 120 on the first radio resource configured in action 132.

It should be noted that actions 131, 132, 133, and 134 are delineated as separate actions in FIG. 1. However, these separately delineated steps should not be construed as necessarily order dependent. The order in which the process is described is not intended to be construed as a limitation, and any number of the described actions may be combined in any order to implement the method. For example, in one implementation, action 131 and action 133 may be completed in a single signaling, where the priority indicator in action 133 may be carried in the RRC message in action 131. In one implementation, action 132 and action 133 may be completed in a single signaling, where the priority indicator in action 133 may be carried in a DCI message that indicates the allocation of the first radio resource (e.g., PUSCH resource) in action 132. In one implementation, action 132 and action 133 may be completed in a single signaling, where the priority indicator in action 133 may be carried in an RRC message that indicates the allocation of the first radio resource in action 132.

Several implementations are provided in subsequent sections based on two scenarios. (1) Scenario 1: upon reception of one UL grant. (2) Scenario 2: upon reception of multiple UL grants within one or more coinciding Physical Downlink Control Channel (PDCCH) occasions or upon request to simultaneously transmit multiple MAC PDUs. A PDCCH occasion may be a time duration (e.g., one or a consecutive number of symbols) during which a MAC entity is configured to monitor the PDCCH.

Scenario 1: Upon Reception of One UL Grant

A UL grant or a PUSCH resource associated with a new MCS table (which may achieve a BLER of $10^{-5}$ (or less)) may be provided specifically to services that require high reliability. Therefore, mechanisms that prioritize type C and type D data may be introduced whenever a UL grant or a PUSCH resource associated with a new MCS table is received for further reliability enhancement and latency reduction. On the other hand, upon reception of a UL grant or a PUSCH resource associated with an old MCS table (which may achieve a BLER of $10^{-1}$), certain methods may also be introduced to prioritize type B data in order to achieve further latency reduction. It should be noted that in the following description, a new MCS table may refer to a MCS table that achieves a lower BLER (e.g., $10^{-5}$ (or less)), whereas an old MCS table may refer to a MCS table that achieves a higher BLER (e.g., $10^{-4}$).

Case 1: Priority Indication in an RRC Message

In Case 1, a one-bit indication may be configured per logical channel (LCH) or per MAC entity. The one-bit indication may be carried in an RRC message. Based on the value indicated by the one-bit indication, a UE may determine which priority order to be used in an LCP procedure when a UL grant or PUSCH resource associated with either a new MCS table or an old MCS table arrives. In one implementation, the priority indicator in action 133 may be the one-bit indication of a MAC entity or an aggregate of the one-bit indication of each logical channel.

Case 1-1: Configured per LCH, Ignoring Parameters Associated with Uplink Data Scheduling In Case 1-1, a base station (e.g., a gNB) may transmit, to a UE, an RRC message to configure a one-bit indication to each LCH. In one implementation, the one-bit indication may be included in an IE LogicalChannelConfig in the RRC message. Indicated LCHs (e.g., with the one-bit indication set as '1') may have a higher priority than unindicated LCHs (e.g., with the one-bit indication set as '0') in an LCP procedure. The priority indicator in action 133 may be an aggregate of the one-bit indication of each logical channel. For example, the first priority order may be used when each LCH has the one-bit indication equal to '0', and the second priority order may be used when at least one LCH has the one-bit indication equal to '1'.

In one implementation, the indicated LCHs may be LCHs supporting type D traffic. In one implementation, the indicated LCHs may have a higher priority than at least one of followings: a C-RNTI MAC CE, data from UL-CCCH, a Configured Grant Confirmation MAC CE, a MAC CE for non-padding BSR, and a MAC CE for single/multiple entry PHR MAC CE, when a UE receives a UL grant. In one implementation, the UL grant that the UE receives may be associated with a new MCS table. In one implementation, the LCP priority order of the indicated LCHs may be either signaled to the UE or preconfigured in the UE. It should be noted all the configured LCHs may still need to follow LCP restrictions in the LCP procedure. In one implementation, each configured LCH may be configured, via an RRC message, one or more LCP restrictions. Data from an LCH may be transmitted on a granted UL resource (e.g., a PUSCH) if the granted UL resource satisfies the one or more LCP restrictions configured to the LCH.

In one implementation, a MAC entity of the UE may allocate resources for all the data that is available for transmission to the indicated LCHs. That is, the MAC entity may ignore parameters associated with uplink data scheduling in the LCP procedure for the indicated LCHs. In one implementation, the parameters associated with uplink data scheduling may include Prioritized Bit Rate (PBR), Bucket Size Duration (BSD), and Priority. In one implementation, the MAC entity may apply the parameters associated with uplink data scheduling (e.g., a PBR, BSD, and Priority) for the unindicated LCHs.

TABLE 1

An example of logical channel configuration in Case 1-1

| Logical Channel | LCH #1 | LCH #2 | LCH #3 |
|---|---|---|---|
| One-bit indication | 1 | 0 | 0 |
| Priority | | 1 | 2 |
| Prioritized Bit Rate | | PBR #2 | PBR #3 |
| Bucket Size Duration | | BSD #2 | BSD #3 |

In the example shown in Table 1 above, the configured logical channels may include LCH #1, LCH #2, and LCH #3. The one-bit indication is '1' for LCH #1 (possibly an LCH supporting type D traffic) and '0' for LCH #2 and LCH #3. In one implementation, a modified LCP order of the example in Table 1 may be as follows (from highest priority to lowest priority):

Data from LCHs that meet LCP restrictions and have the one-bit indication as '1', LCH #1 in this case. All resources available for transmission for LCH #1 may be allocated. LCH #1 may ignore the parameters associated with uplink data scheduling.
C-RNTI MAC CE or data from UL-CCCH;
Configured Grant Confirmation MAC CE;
MAC CE for BSR, with exception of BSR included for padding;
Single Entry PHR MAC CE or Multiple Entry PHR MAC CE;
Data from LCHs that meet LCP restrictions and have the one-bit indication as '0', LCH #2 and LCH #3 in this case. LCH #2 and LCH #3 may apply the parameters associated with uplink data scheduling. If any resources remain, all the LCHs that meet LCP restrictions and have the one-bit indication as '0' may be served in a strict decreasing priority order (regardless of the value Bj, which is a variable maintained for each logical channel in the LCP procedure), in this case LCH #2 and then LCH #3, until either the data for that LCH or the UL grant is exhausted, whichever comes first.
MAC CE for Recommended bit rate query;
MAC CE for BSR included for padding.

In one implementation, the value Bj may indicate an upper limit of uplink resources that may be allocated to a logical channel. In the example shown above, the indicated LCH (e.g., LCH #1) has the highest priority. However, in other implementations, the indicated LCH may have a higher priority than at least one of followings: a C-RNTI MAC CE, data from UL-CCCH, a Configured Grant Confirmation MAC CE, a MAC CE for non-padding BSR, and a MAC CE for single/multiple entry PHR MAC CE.

In one implementation, neither the format of a MAC Service Data Unit (SDU) which contains the data in LCH #1 nor the format of a corresponding MAC subheader needs to be changed. Moreover, the base station may identify the subPDU (which includes the MAC SDU and the corresponding subheader) from a Logical Channel ID (LCID) associated with LCH #1.

Case 1-2: Configured per LCH, Applying Parameters Associated with Uplink Data Scheduling In Case 1-2, a base station (e.g., a gNB) may transmit, to a UE, an RRC message to configure a one-bit indication to each LCH, similar to Case 1-1. In one implementation, the indicated LCHs may be LCHs supporting type D traffic. In one implementation, the indicated LCHs may have a higher priority than at least one of followings: a C-RNTI MAC CE, data from UL-CCCH, a Configured Grant Confirmation MAC CE, a MAC CE for non-padding BSR, and a MAC CE for single/multiple entry PHR MAC CE, when a UE receives a UL grant. In one implementation, the UL grant that the UE receives may be associated with a new MCS table.

In one implementation, all of the configured LCHs, whether an indicated LCH or an unindicated LCH, may apply the parameters associated with uplink data scheduling (e.g., a PBR, BSD, and Priority). With the adoption of these parameters, the base station may limit the amount of type D data from the indicated LCHs to be allocated before the MAC CEs in the first round of a token bucket. It should be noted that a configuration restriction in Case 1-2 may be that the priority of the indicated LCHs is always higher than the priority of all the unindicated LCHs except data from UL-CCCH. This restriction may be needed to avoid a case where an unindicated LCH has a higher priority than an indicated LCH.

In Case 1-2, the indicated LCHs that satisfy LCP restrictions and have Bj>0 may be allocated resources in a decreasing priority order. Afterwards, the MAC entity may then allocate data from UL-CCCH, or MAC CEs of specific types, subject to the LCP order shown above. Then the MAC entity may allocate data from the unindicated LCHs with Bj>0. If all the data from the unindicated LCHs with Bj>0 has been allocated and there is resource remaining, all the LCHs that meet the LCP restrictions, regardless of indicated or unindicated LCHs, may be served in a strict decreasing priority order regardless of the value Bj until either the data for that LCH or the UL grant is exhausted, whichever comes first. LCHs configured with equal priority may be served equally. After allocating data from the LCHs, the MAC entity may allocate MAC CEs for recommended bit rate query and for padding BSRs.

TABLE 2

An example of logical channel configuration in Case 1-2

| Logical Channel | LCH #1 | LCH #2 | LCH #3 |
| --- | --- | --- | --- |
| One-bit indication | 1 | 0 | 0 |
| Priority | 1 | 2 | 3 |
| Prioritized Bit Rate | PBR #1 | PBR #2 | PBR #3 |
| Bucket Size Duration | BSD #1 | BSD #2 | BSD #3 |

In one implementation, a modified LCP order of the example in Table 2 may be as follows (from highest priority to lowest priority):
Data from LCHs that meet LCP restrictions and have the one-bit indication as '1', LCH #1 in this case. LCH #1 may apply the parameters associated with uplink data scheduling.
C-RNTI MAC CE or data from UL-CCCH;
Configured Grant Confirmation MAC CE;
MAC CE for BSR, with exception of BSR included for padding;
Single Entry PHR MAC CE or Multiple Entry PHR MAC CE;
Data from LCHs that meet LCP restrictions and have the one-bit indication as '0', LCH #2 and LCH #3 in this case. LCH #2 and LCH #3 may apply the parameters associated with uplink data scheduling. If any resources remain, all the LCHs that meet LCP restrictions and have the one-bit indication as '0' may be served in a strict decreasing priority order (regardless of the value Bj), in this case LCH #1, LCH #2 and then LCH #3, until either the data for that LCH or the UL grant is exhausted, whichever comes first.
MAC CE for Recommended bit rate query;
MAC CE for BSR included for padding.

Case 1-3: Configured Per MAC Entity

In Case 1-3, a base station (e.g., a gNB) may transmit, to a UE, an RRC message to configure a one-bit indication to each MAC entity of the UE. In one implementation, a MAC entity may use the first priority order in an LCP procedure when the one-bit indication of the MAC entity is equal to '0', and the MAC entity may use the second priority order in the LCP procedure when the one-bit indication of the MAC entity is equal to '1'. In one implementation, when the second priority order is used in the LCP procedure (e.g., the one-bit indication of the MAC entity is equal to '1'), data from a logical channel that is associated to the MAC entity has a higher priority than at least one of following: a C-RNTI MAC CE, data from UL-CCCH, a configured grant confirmation MAC CE, a MAC CE for BSR except for padding, and a PHR MAC CE. In one implementation, all the logical channels of the MAC entity may apply the configured parameters associated with uplink data scheduling, including PBR, BSD, and Priority.

TABLE 3

An example of logical channel configuration in Case 1-3

| Logical Channel | LCH #1 | LCH #2 | LCH #3 |
| --- | --- | --- | --- |
| One-bit indication | 1 (configured per MAC entity) | | |
| Priority | 1 | 2 | 3 |
| Prioritized Bit Rate | PBR #1 | PBR #2 | PBR #3 |
| Bucket Size Duration | BSD #1 | BSD #2 | BSD #3 |

In the example shown in Table 3 above, configured logical channels in the MAC entity may include LCH #1, LCH #2, and LCH #3. The one-bit indication is '1' for the MAC entity, and thus all the logical channels LCH #1, LCH #2 and LCH #3. In one implementation, a modified LCP order of the example in Table 3 may be as follows (from highest priority to lowest priority):
Data from all configured LCHs that meet LCP restrictions. LCH #1, LCH #2, and LCH #3 in this case. LCH #1, LCH #2, and LCH #3 may apply the parameters associated with uplink data scheduling;
C-RNTI MAC CE or data from UL-CCCH;
Configured Grant Confirmation MAC CE;
MAC CE for BSR, with exception of BSR included for padding;
Single Entry PHR MAC CE or Multiple Entry PHR MAC CE;
MAC CE for Recommended bit rate query;
MAC CE for BSR included for padding.

Case 1-4: UL Grant is Associated with an Old MCS Table

Cases 1-1, 1-2, and 1-3 may be extended to cases where a UL grant is associated with an old MCS table. In one implementation, a base station (e.g., a gNB) may configure certain LCHs (Case 1-1 and Case 1-2) or configure all LCHs at one shot (Case 1-3) to have a higher priority than at least one of followings: a C-RNTI MAC CE, data from UL-CCCH, a Configured Grant Confirmation MAC CE, a MAC CE for non-padding BSR, and a MAC CE for single/multiple entry PHR MAC CE, when a UE receives a UL grant that is associated with an old MCS table. This may benefit type B traffic, which does not require high reliability but is delay sensitive.

Case 1-5: UL Grant is Associated with Any MCS Table

Cases 1-1, 1-2, and 1-3 may be extended to cases where a UL grant is associated with any MCS table (e.g., including a new MCS table and an old MCS table). In one implementation, a base station (e.g., a gNB) may configure certain LCHs (Case 1-1 and Case 1-2) or configure all LCHs at one shot (Case 1-3) to have a higher priority than at least one of followings: a C-RNTI MAC CE, data from UL-CCCH, a Configured Grant Confirmation MAC CE, a MAC CE for non-padding BSR, and a MAC CE for single/multiple entry PHR MAC CE, when a UE receives a UL grant or PUSCH resource associated with any MCS table. This may benefit type B or type D traffic which requires high latency/high reliability to have a higher priority in the LCP procedure whenever a UL grant arrives.

Case 2: Priority Indication in a DCI Message

In Case 2, an indication of one or more bits may be provided in a field that is carried in a DCI message (e.g., a UL grant). The DCI message may indicate a priority order and/or a resource limitation in an LCP procedure. Based on the DCI message, a UE may determine which priority order to be used when transmitting on a radio resource for uplink transmission indicated by the DCI message (e.g., a UL grant) and/or whether the configured LCHs of certain LCH ID/Logical Channel Group (LCG) ID/priority level may use the received UL grant for transmission. In one implementation, the DCI message may indicate whether the LCP procedure is applied to a subset of the configured logical channels. This subset may be a part of or all of the configured logical channels. That is, the number of logical channels in the subset may be less than or equal to the total number of the configured logical channels. In one implementation, the DCI message may indicate allocation of a radio resource for uplink transmission.

Case 2-1: The DCI Message Including an Index Indicates the Subset

In one implementation, the DCI message (e.g., a UL grant) may indicate that the granted UL resources are valid for certain LCHs. For example, a UE may perform an LCP procedure on only certain LCHs, whereas the other LCHs may be ignored for the LCP procedure.

In one implementation, the DCI message (e.g., a UL grant) may include an index having x-bits to provide a restriction, where x may be a positive integer. In one implementation, the index set as '0' may represent that all LCHs may use this UL grant, the index set as '1' may represent that only LCH with LogicalChannelIdentity of '1' may use this UL grant, the index set as 2 may represent that LCHs with LogicalChannelIdentity of '1' and '2' may use this UL grant, and so on. In one implementation, a mapping table that maps the index to the LCHs that involve in an LCP procedure may be preconfigured by the UE or signalled from a base station (e.g., a gNB). In one implementation, the mapping table may provide mapping between the index to specific LCGs that involve in the LCP procedure, or provide mapping between the index to LCHs with specific priority levels that involve in the LCP procedure.

Case 2-2: An RRC Message Indicates the Subset

In Case 2-2, the DCI message (e.g., a UL grant) may include a one-bit DCI field. In one implementation, the one-bit DCI field set as '0' may indicate that a normal LCP procedure is applied for this UL grant. The one-bit field set as '1' may indicate that the LCP procedure is applied on only indicated LCHs for this UL grant. For example, the UL grant may not be used for any other MAC CE or MAC SDU from other LCHs except for the indicated LCHs. The indicated LCHs may be signalled by a base station (e.g., a gNB). In one implementation, the indicated LCHs may be indicated by a one-bit indication in an IE LogicalChannelConfig carried in an RRC message, as shown in Case 1-1 through Case 1-5. In this implementation, the RRC message may indicate a subset of the configured logical channels that involve in the LCP procedure.

Case 2-3: The DCI Message Indicates a Priority Order

Case 1-3 may be extended to use a one-bit indication in a DCI field associated to the UL grant. In Case 2-3, the DCI message may include a one-bit DCI field. In one implementation, the one-bit DCI field set as '0' may indicate that a normal LCP procedure is applied for this UL grant. The one-bit field set as '1' may indicate that all configured LCHs (of a MAC entity) may have a higher priority than at least one of followings: a C-RNTI MAC CE, data from UL-CCCH, a Configured Grant Confirmation MAC CE, a MAC CE for non-padding BSR, and a MAC CE for single/multiple entry PHR MAC CE. In one implementation, all of the configured LCHs may apply the parameters associated uplink data scheduling, including Priority, PBR, and BSD. In Case 2-3, the priority indicator in action 133 shown in FIG. 1 may be carried in the DCI message received from the base station 120.

Case 3: A Base Station Indicating a Subset of LCHs When Configuring an RNTI

In one implementation, while configuring a new RNTI to a UE, a base station (e.g., a gNB) may optionally configure a list from the same IE where the new RNTI is located. The list may identify the LCHs with certain LCH ID, LCG ID, or LCH priority list that may use a UL grant or PUSCH resource associated with the new RNTI.

Case 4: Different Priority Orders for Different MCS Levels/MCS Tables/RNTIs

A UE may be configured with an MCS level-specific LCH prioritization order rule, an MCS table-specific LCH prioritization order rule, or an RNTI-specific LCH prioritization order rule. Each LCH prioritization rule may be predefined or preconfigured in the UE. Within each LCH prioritization rule, an example priority order may be as follows (from highest priority to lowest priority):

C-RNTI MAC CE or data from UL-CCCH;
Configured Grant Confirmation MAC CE;
MAC CE for BSR, with exception of BSR included for padding;
Single Entry PHR MAC CE or Multiple Entry PHR MAC CE;
Data from any logical channel, except data from UL-CCCH;
QMAC CE for Recommended bit rate query;
MAC CE for BSR included for padding.

In one implementation, a MAC entity of the UE may apply different priority orders for each of the elements above for different uplink radio resources granted by the base station (e.g., a gNB), wherein the different uplink radio resource may be associated with different MCS levels, different MCS tables, or different RNTI types, particularly C-RNTI and new RNTI.

Case 5: One LCH May Be Associated with Two Sets of LCP Parameters

In one implementation, LCP parameters (which may be configured in an IE LogicalChannelConfig) of each LCH may be the same for any grant type. However, having the same parameters for UL grant or PUSCH resource associated with both new MCS table and old MCS table may not efficiently map the traffic with different service requirements to the suitable grant. In one implementation, a UE may support all types of traffic as mentioned above, e.g., supporting both eMBB and URLLC. Whenever data arrives on an LCH supporting traffic type C or type D, a base station (e.g., a gNB) may want to provide this data type with higher allocation priority particularly on a UL grant or PUSCH resource associated with a new MCS table when comparing with a UL grant with an old MCS table. Hence, some LCP parameters may be configured differently for UL grant with different MCS tables. There may be two types of MCS tables associated with a UL grant. In this sense, the base station may optionally configure a new set of LCP parameters, including Priority, PBR, and BSD, for the new MCS table. In one implementation, the UE may use the LCP parameters associated with the old MCS table if the corresponding LCP parameters associated with the new MCS table are not configured.

In one implementation, a priority level of LCHs supporting type C and type D may be set to the lowest level among all configured LCHs for grants associated with an old MCS table, and the priority level of these LCHs may be set to the highest level among all configured LCHs for grants associated with a new MCS table. In one implementation, a base station may set a parameter prioritisedBitRate-newMCStable for grants associated with the new MCS table to infinity if such an LCH supports either type C or type D traffic, and set a parameter prioritisedBitRate for grants associated with the old MCS table to a relatively low value. Examples in Case 5 may differentiate type C or D traffic from type A or B traffic when receiving UL grants associated with different MCS tables, without completely eliminating certain traffic from accessing a specific type of grant.

In one implementation, LCP parameters associated with the new MCS table may optionally be configured in an IE LogicalChannelConfig. An example of such logical channel configuration is shown below. Abstract Syntax Notation One (ASN.1) may be used to describe the data structure of various implementations in the present application.

The condition "a MAC entity of a UE receives multiple UL grants within one or more coinciding PDCCH occasions" may be: (1) Fully overlapping search spaces with DCIs indicating PUSCH allocations, (2) Partially overlapping search spaces with DCIs indicating PUSCH allocations. Moreover, the time relation between the PUSCH resources indicated by the UL grants may be one of the following: (1) fully overlapping PUSCH resources, (2) partially overlapping PUSCH resources, and (3) completely non-overlapping PUSCH resources.

In one implementation, a UE may decide which grant is processed first when (a) multiple search spaces with DCIs fully-overlapping/partially-overlapping/non-overlapping in the time domain is received, and the corresponding PUSCH resources indicated by the DCIs are fully-overlapping/partially-overlapping in the time domain, or (b) multiple search spaces with DCIs fully-overlapping/partially-overlapping in the time domain is received, and the corresponding PUSCH resources indicated by the DCIs are fully-overlapping/partially-overlapping/non-overlapping in the time domain.

Figure 2:
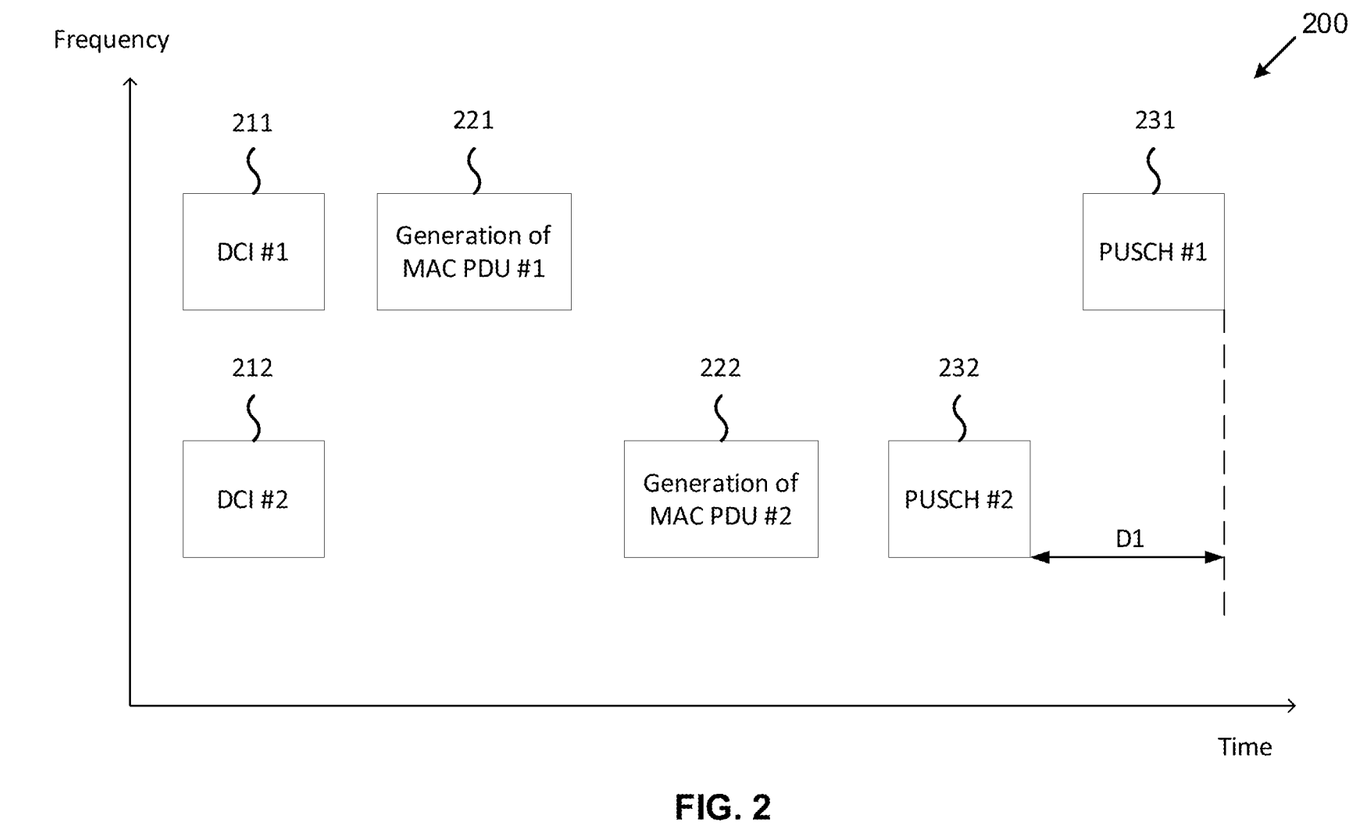
FIG. 2 is a diagram illustrating multiple DCI messages overlapping in the time domain, according to an example implementation of the present application.

The order in which the UL grants are processed may affect the latency of the service. FIG. 2 is a diagram 200 illustrating multiple DCI messages overlapping in the time domain, according to an example implementation of the present application. A MAC entity of a UE may receive two search spaces with DCIs fully overlapping in the time domain (e.g., DCI #1 211 and DCI #2 212), and the corresponding PUSCH resources indicated by the DCIs may be completely non-overlapping in the time domain (e.g., a PUSCH #1 231 and a PUSCH #2 232). The PUSCH #1 231 allocation timespan indicated by DCI #1 211 may end later than the

```
LogicalChannelConfig ::=    SEQUENCE {
    ul-SpecificParameters       SEQUENCE {
        priority                    INTEGER (1..16),
        prioritisedBitRate          ENUMERATED {kBps0, kBps8, kBps16, kBps32,
kBps64, kBps128, kBps256, kBps512, kBps1024, kBps2048, kBps4096, kBps8192,
kBps16384, kBps32768, kBps65536, infinity},
        bucketSizeDuration          ENUMERATED {ms5, ms10, ms20, ms50, ms100,
ms150, ms300, ms500, ms1000, spare7, spare6, spare5, spare4, spare3, spare2, spare1},
        priority-new-MCStable       INTEGER (1..16),           OPTIONAL -- Need R
        prioritisedBitRate-new-MCStable     ENUMERATED {kBps0, kBps8, kBps16,
kBps32, kBps64, kBps128, kBps256, kBps512, kBps1024, kBps2048, kBps4096, kBps8192,
kBps16384, kBps32768, kBps65536, infinity},                    OPTIONAL -- Need R
        bucketSizeDuration-new-MCStable     ENUMERATED {ms5, ms10, ms20, ms50,
ms100, ms150, ms300, ms500, ms1000, spare7, spare6, spare5, spare4, spare3, spare2, spare1},
OPTIONAL -- Need R
        ...
    }                                                          OPTIONAL, -- Cond UL
    ...
}
```

Scenario 2: Upon Reception of Multiple UL Grants within One or More Coinciding PDCCH Occasions (e.g., on different serving cells) or Upon Request To Simultaneously Transmit Multiple MAC PDUs The condition "a MAC entity of a UE is requested to simultaneously transmit multiple MAC PDUs" may be: (1) multiple MAC PDUs fully overlapping in the time domain (fully overlapped PUSCH resources), (2) multiple MAC PDUs partially overlapping in the time domain (partially overlapped PUSCH resources). Furthermore, the time relation between the search spaces containing DCIs that provide the PUSCH allocations may be one of the following: (1) search spaces are fully overlapping in the time domain, (2) search spaces are partially overlapping in the time domain, and (3) search spaces are completely non-overlapping in the time domain.

PUSCH #2 232 allocation timespan indicated by DCI #2 212. Both the PUSCH allocations 231 and 232 may meet the LCP restrictions of an LCH (e.g., LCH #1) supporting delay sensitive service (e.g., a URLLC service). If the UE decides to process the UL grant associated with DCI #1 211 first, the data in LCH #1 may undergo a process 221 of generating MAC PDU #1 corresponding to DCI #1 211. The generated MAC PDU #1 may then be transmitted at the PUSCH #1 231 provided by DCI #1 211. This behavior may introduce more delay than the case where the UE processes the UL grant associated with DCI #2 212 before DCI #1 211. The extra delay may be represented by the delay D1 shown in FIG. 2. Based on this observation, it may be better not to leave the order of processing grant to UE implementation, especially in the case where high reliability services are running. Implementations are provided below to ensure the latency of LCHs that support type B or type D traffic may be further reduced.

Case 6-1: Priority Indicator in Case 1 is Adopted

In Case 6-1, a priority indicator may be provided in an RRC message, as shown in Case 1-1 through Case 1-5. In one implementation, a UE may check the priority indicator (e.g., a one-bit indication, either configured per LCH or per MAC entity) to determine whether to use the first priority order (e.g., a normal LCP order) or the second priority order (e.g., a modified LCP order). If the second priority order is used, when a MAC entity is requested to simultaneously transmit multiple MAC PDUs, or when the MAC entity receives multiple UL grants within one or more coinciding PDCCH occasions (e.g., on different serving cells), the UE may check the timespan of each corresponding PUSCH allocation. In one implementation, the UL grant processing order may be based on the ending time of the corresponding PUSCH allocation. In one implementation, the UE may process the UL grant with the earliest corresponding PUSCH ending time, followed by the second earliest ending time, and so on. By adopting the method provided in Case 6-1, when any LCH associated with delay sensitive traffic is configured, data may always be transmitted at the earliest allocated PUSCH for further latency reduction.

Case 6-2: Priority Indicator in Case 2 is Adopted

In Case 6-2, a priority indicator may be provided in a DCI message (e.g., a UL grant), as shown in Case 2-1 through Case 2-3. For example, an indication of one or more bits may be provided in a field that is carried in the DCI message (e.g., a UL grant). In one implementation, a MAC entity may be requested to simultaneously transmit multiple MAC PDUs (e.g., corresponding to DCI #1 and DCI #2, respectively) or the MAC entity may receive multiple UL grants (e.g., corresponding to DCI #1 and DCI #2, respectively) within one or more coinciding PDCCH occasions (e.g., on different serving cells). The UE may check whether any of the DCI fields from the received DCI messages (e.g., any one of DCI #1 and DCI #2) indicates a change in LCP order or indicates that the UL resource indicated by the UL grant is intended for a subset of configured LCHs (e.g., LCHs with specific LCH ID/LCG ID/LCH priority only). If so (e.g., any of the received DCI messages (e.g., a UL grant) indicates a modified LCP order), the UL grant processing order may follow the mechanism provided in Case 6-1. For example, the UE may process the UL grant with the earliest corresponding PUSCH ending time, followed by the second earliest ending time, and so on.

Case 6-3: A Subset of LCHs is Indicated During RNTI Configuration

In Case 6-3, a list that identifies the LCHs available for the UL grant or PUSCH resource associated with the new MCS table may be provided, as shown in Case 3. If a MAC entity is requested to simultaneously transmit multiple MAC PDUs, or if the MAC entity receives multiple UL grants within one or more coinciding PDCCH occasions (e.g., on different serving cells), and at least one of the received UL grants is associated with the new MCS table, the MAC entity may further check whether the list shown in Case 3 is configured. In one implementation, the list may indicate that only LCHs with certain LCH ID/LCG ID/LCH priority may access the UL grant with the new MCS table. If such list is configured, the UL grant processing order may follow the mechanism provided in Case 6-1.

Case 6-4: One LCH may be Associated with Two Sets of LCP Parameters

In Case 6-4, the MCS table-specific LCP parameters provided in Case 5 may be adopted. In one implementation, a MAC entity may check whether any of the MCS table-specific LCP parameters (e.g., a priority-new-MCStable, prioritisedBitRate-new-MCStable, or bucketSizeDuration-new-MCStable) is configured. If any of the MCS table-specific LCP parameters is configured, when the MAC entity is requested to simultaneously transmit multiple MAC PDUs, or when the MAC entity receives multiple UL grants within one or more coinciding PDCCH occasions (e.g., on different serving cells), the UE may check whether any of the received UL grants is associated with a new RNTI (which implies that the radio resource indicated by the UL grant is associated with a new MCS table). If any of the received UL grants is associated with the new MCS table, the UL grant processing order may follow the mechanism provided in Case 6-1.

Case 6-5: Earliest PUSCH Starting Time

Case 6-5 may be an extension of Case 6-1 through Case 6-4. In Case 6-5, the UL grant processing order may begin with earliest corresponding PUSCH starting time, followed by the second earliest PUSCH starting time, and so on.

Figure 3:
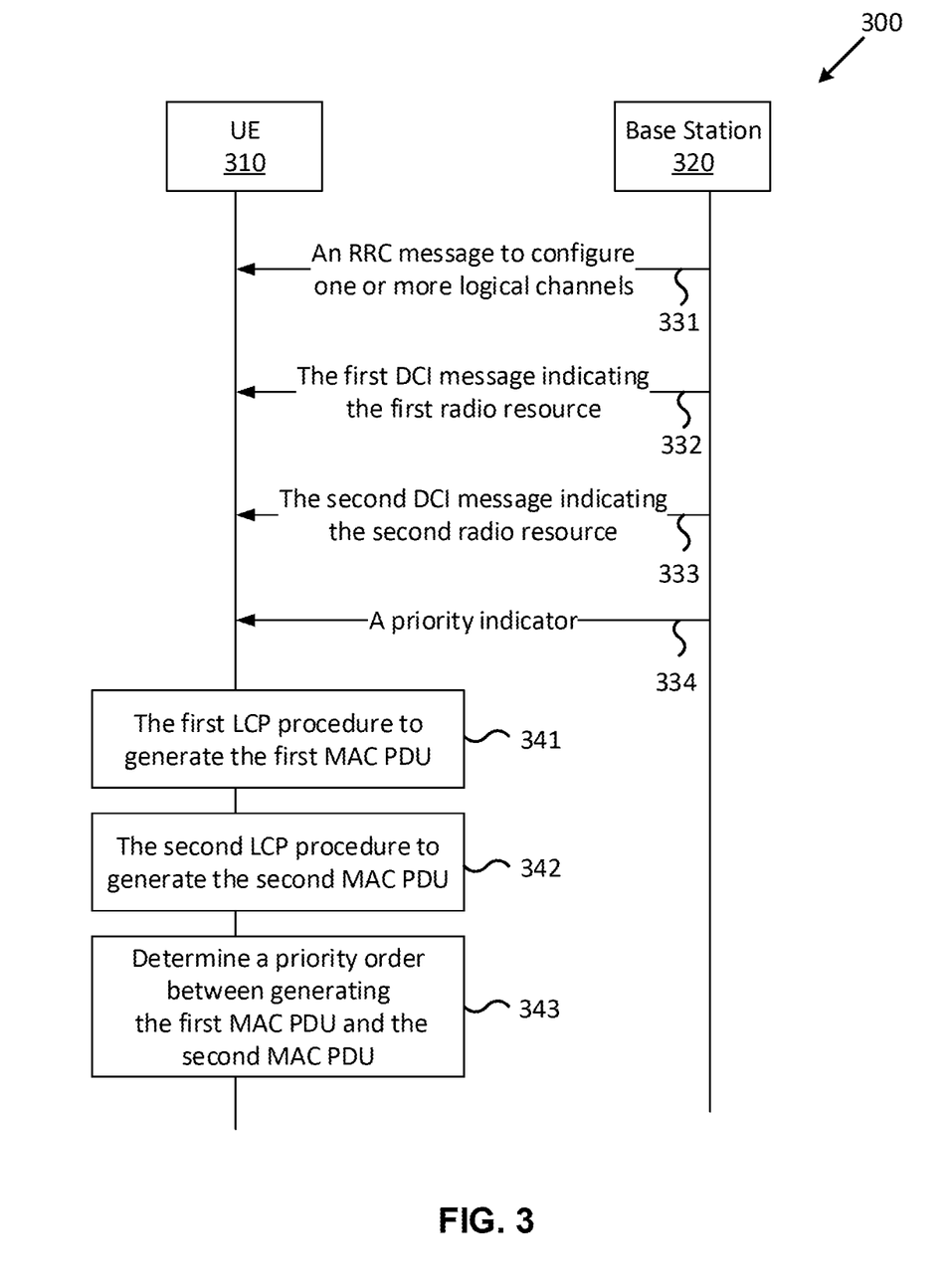
FIG. 3 is a diagram illustrating a process of a UE generating multiple MAC PDUs corresponding to multiple DCI messages, according to an example implementation of the present application.

FIG. 3 is a diagram 300 illustrating a process of a UE generating multiple MAC PDUs corresponding to multiple DCI messages, according to an example implementation of the present application. In action 331, a UE 310 may receive, from a base station 320 (e.g., a gNB), an RRC message to configure one or more logical channels. In action 332, the UE may receive the first DCI message (e.g., a UL grant) that indicates the first radio resource for uplink transmission. In one implementation, action 332 may be corresponding to action 132 shown in FIG. 1. In action 333, the UE may receive the second DCI message (e.g., a UL grant) that indicates the second radio resource for uplink transmission. The first DCI message and the second DCI message may overlap in the time domain. In action 334, the UE 310 may receive, from the base station 320, a priority indicator, which may be provided in an RRC message or in a DCI message (e.g., the first DCI message in action 332 and/or the second DCI message in action 333).

In action 341, the UE 310 may apply the first LCP procedure on the one or more logical channels to generate the first MAC PDU to be transmitted on the first radio resource. In action 342, the UE 310 may apply the second LCP procedure on the one or more logical channels to generate the second MAC PDU to be transmitted on the second radio resource. Referring to the example shown in FIG. 2, the first DCI message received in action 332 may be corresponding to DCI #1 211, and the second DCI message received in action 333 may be corresponding to DCI #2 212. Actions 341 and 342 may be corresponding to the processes 221 and 222, respectively. The first radio resource may be corresponding to the PUSCH #1 231, and the second radio resource may be corresponding to the PUSCH #2 232.

Based on the priority indicator received in action 334, the UE 310 may decide whether to use the first priority order (e.g., a normal LCP order) or the second priority order (e.g., a modified LCP order) in each of the first and the second LCP procedures. When the second priority order is used in at least one of the first LCP procedure and the second LCP procedure, the UE may perform action 343 to determine a priority order between generating the first MAC PDU and the second MAC PDU based on a timer order between the first radio resource and the second radio resource. In one implementation, the time order between different radio resources may be determined according to at least one of the starting time of the radio resource and the ending time of the radio resource.

Referring to the example shown in FIG. 2, the ending time of the PUSCH #2 232 is earlier than the ending time of the PUSCH #1 231. As such, when the UE determines that the second priority order (e.g., a modified LCP order) is used in either the first LCP procedure (e.g., the process 221) or the second LCP procedure (e.g., the process 222), the UE may determine that the process 222 of generating the MAC PDU #2 has a higher priority than the process 221 of generating the MAC PDU #1. That is, the UE may first apply the second LCP procedure to generate the MAC PDU #2, and then apply the first LCP procedure to generate the MAC PDU #1.

It should be noted that actions 331, 332, 333, 334, 341, 342 and 343 are delineated as separate actions in FIG. 3. However, these separately delineated steps should not be construed as necessarily order dependent. The order in which the process is described is not intended to be construed as a limitation, and any number of the described actions may be combined in any order to implement the method. For example, in one implementation, the priority indicator in action 334 may be carried in any of actions 331, 332 and 333. In one implementation, action 343 may be optionally performed based on the priority indicator received in action 334. In one implementation, the time order between actions 341 and 342 may be based on a determination result of action 343.

It should be noted that the NR gNB or the cell mentioned in the disclosure may be applied to any base station, regardless the radio access technologies.

Figure 4:
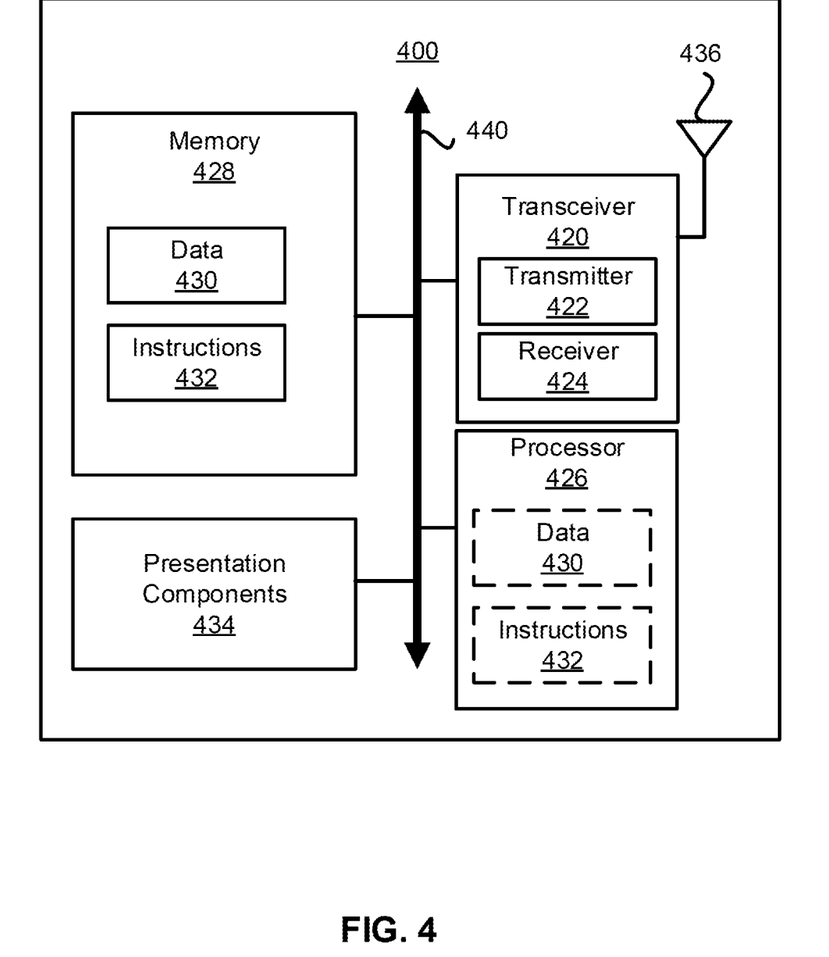
FIG. 4 is a block diagram illustrating a node for wireless communication, in accordance with various aspects of the present application.

FIG. 4 is a block diagram illustrating a node for wireless communication, in accordance with various aspects of the present application. As shown in FIG. 4, a node 400 may include a transceiver 420, a processor 428, a memory 434, one or more presentation components 438, and at least one antenna 436. The node 400 may also include an RF spectrum band module, a base station communications module, a network communications module, and a system communications management module, Input/Output (I/O) ports, I/O components, and power supply (not explicitly shown in FIG. 4). Each of these components may be in communication with each other, directly or indirectly, over one or more buses 440. In one implementation, the node 400 may be a UE or a base station that performs various functions described herein, for example, with reference to FIGS. 1 through 3.

The transceiver 420 having a transmitter 422 (e.g., transmitting/transmission circuitry) and a receiver 424 (e.g., receiving/reception circuitry) may be configured to transmit and/or receive time and/or frequency resource partitioning information. In some implementations, the transceiver 420 may be configured to transmit in different types of subframes and slots including, but not limited to, usable, non-usable and flexibly usable subframes and slot formats. The transceiver 420 may be configured to receive data and control channels.

The node 400 may include a variety of computer-readable media. Computer-readable media may be any available media that may be accessed by the node 400 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or data.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 434 may include computer-storage media in the form of volatile and/or non-volatile memory. The memory 434 may be removable, non-removable, or a combination thereof. Example memory includes solid-state memory, hard drives, optical-disc drives, and etc. As illustrated in FIG. 4, The memory 434 may store computer-readable, computer-executable instructions 432 (e.g., software codes) that are configured to, when executed, cause the processor 428 to perform various functions described herein, for example, with reference to FIGS. 1 through 3. Alternatively, the instructions 432 may not be directly executable by the processor 428 but be configured to cause the node 400 (e.g., when compiled and executed) to perform various functions described herein.

The processor 428 (e.g., having processing circuitry) may include an intelligent hardware device, e.g., a Central Processing Unit (CPU), a microcontroller, an ASIC, and etc. The processor 428 may include memory. The processor 428 may process the data 430 and the instructions 432 received from the memory 434, and information through the transceiver 420, the base band communications module, and/or the network communications module. The processor 428 may also process information to be sent to the transceiver 420 for transmission through the antenna 436, to the network communications module for transmission to a core network.

One or more presentation components 438 presents data indications to a person or other device. Examples of presentation components 438 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A user equipment (UE), comprising:
one or more non-transitory computer-readable media having computer-executable instructions embodied thereon; and
at least one processor coupled to the one or more non-transitory computer-readable media, wherein the at least one processor is configured to execute the computer-executable instructions to:
receive, from a base station, a first Radio Resource Control (RRC) message to configure one or more logical channels, each of the one or more logical channels configured with a logical channel priority indicated by the first RRC message;
receive, from the base station, a second RRC message, each of the one or more logical channels further configured with an indicator included in the second RRC message, the indicator having one of a first value and a second value;
receive, from the base station, a first Downlink Control Information (DCI) message that indicates an allocation of a first radio resource for uplink transmission, the first DCI message including a field indicating one of the first value and the second value, the first DCI message further indicating that only data from at least one of the one or more logical channels configured with the indicator having the same value as indicated in the field is allowed to be transmitted on the first radio resource; and
apply a first Logical Channel Prioritization (LCP) procedure on the at least one of the one or more logical channels configured with the indicator having the same value as indicated in the field to generate a first Medium Access Control (MAC) Protocol Data Unit (PDU) to be transmitted on the first radio resource,
wherein:
the first LCP procedure includes allocating the first radio resource to each of the at least one of the one or more logical channels configured with the indicator having the same value as indicated in the field in a decreasing order of the logical channel priority indicated by the first RRC message; and
the first MAC PDU includes data associated with the at least one of the one or more logical channels configured with the indicator having the same value as indicated in the field.

2. The UE of claim 1, wherein the first RRC message is the same as the second RRC message.

3. The UE of claim 1, wherein the indicator comprises one bit.

4. The UE of claim 1, wherein the indicator is in a LogicalChannelConfig Information Element (IE) included in the second RRC message.

5. The UE of claim 1, wherein the field comprises one bit.

6. The UE of claim 1, wherein the at least one processor is further configured to execute the computer-executable instructions to:
receive, from the base station, a second DCI message, wherein:
the second DCI message indicates a second radio resource for the uplink transmission,
and
the first DCI message and the second DCI message overlap in time domain;
apply a second LCP procedure on the one or more logical channels to generate a second MAC PDU to be transmitted on the second radio resource; and
determine a priority order between generating the first MAC PDU and the second MAC PDU based on a time order between the first radio resource and the second radio resource.

7. A method for generating a Medium Access Control (MAC) Protocol Data Unit (PDU) performed by a UE, the method comprising:
receiving, from a base station, a first Radio Resource Control (RRC) message to configure one or more logical channels, each of the one or more logical channels configured with a logical channel priority indicated by the first RRC message;
receiving, from the base station, a second RRC message, each of the one or more logical channels further configured with an indicator included in the second RRC message, the indicator having one of a first value and a second value;
receiving, from the base station, a first Downlink Control Information (DCI) message that indicates an allocation of a first radio resource for uplink transmission, the first DCI message including a field indicating one of the first value and the second value, the first DCI message further indicating that only data from at least one of the one or more logical channels configured with the indicator having the same value as indicated in the field is allowed to be transmitted on the first radio resource; and
applying a first Logical Channel Prioritization (LCP) procedure on the at least one of the one or more logical channels configured with the indicator having the same value as indicated in the field to generate a first Medium Access Control (MAC) Protocol Data Unit (PDU) to be transmitted on the first radio resource,
wherein:
the first LCP procedure includes allocating the first radio resource to each of the at least one of the one or more logical channels configured with the indicator having the same value as indicated in the field in a decreasing order of the logical channel priority indicated by the first RRC message; and
the first MAC PDU includes data associated with the at least one of the one or more logical channels configured with the indicator having the same value as indicated in the field.

8. The method of claim 7, wherein the first RRC message is the same as the second RRC message.

9. The method of claim 7, wherein the indicator comprises one bit.

10. The method of claim 7, wherein the indicator is in a LogicalChannelConfig Information Element (IE) included in the second RRC message.

11. The method of claim 7, wherein the field comprises one bit.

12. The method of claim 7, further comprising:
receiving, from the base station, a second DCI message, wherein:
the second DCI message indicates a second radio resource for the uplink transmission,
and
the first DCI message and the second DCI message overlap in time domain;
applying a second LCP procedure on the one or more logical channels to generate a second MAC PDU to be transmitted on to the second radio resource; and determining a priority order between generating the first MAC PDU and the second MAC PDU based on a time order between the first radio resource and the second radio resource.

\* \* \* \* \*